2,960,535
NITROGENOUS COMPOSITIONS

Harold R. Bylsma, Midland, Mich., assignor to The Dow Chemical Company, Midland, Mich., a corporation of Delaware No Drawing. Filed Aug. 7, 1959, Ser. No. 832,135

1 Claim. (Cl. 260—567.6)

The present invention relates to nitrogenous compositions and more particularly to quaternary ammonium compounds suitable for various uses such as detergents, flocculating agents, flotation agents, germicides, fungicides, nematocides, preservatives, precipitating agents and emulsifying agents.

The products of the present invention are nonpolymeric, water-soluble quaternary ammonium halides obtained by the reaction of an organic halogen compound on a nitrogenous condensation product prepared by the reaction of an aliphatic amino compound having the formula $$X—(C_nH_{2n}NH)_2—H$$

wherein X is a member of the group consisting of amino and hydroxyl and wherein n is an integer of from 2 to 3, inclusive, with 1.5 to 2.5 molar proportions of an aldehyde selected from the group consisting of lower aliphatic aldehydes and benzaldehyde. The organic halogen compounds herein employed are those in which the halogen atom is attached to a saturated carbon atom. Suitable halogen compounds include alkyl halides, alkenyl halides, aralkyl halides and alkylene dihalides. The halogen in these compounds is either chlorine or bromine. Particularly suitable are alkyl halides containing from 2 to 16 carbon atoms, inclusive, and alkylene dihalides containing from 2 to 4 carbon atoms, inclusive. The preferred species are alkyl halides containing from 8 to 16 carbon atoms, inclusive. Examples of suitable halogen compounds are ethylene dibromide, trimethylene dibromide, tetramethylene dibromide, ethyl bromide, butyl bromide, secondary-butyl bromide, octyl bromide, lauryl bromide, cetyl bromide, amyl bromide, propyl bromide, isobutyl chloride, ethyl chloride, octyl chloride, benzyl chloride, 3,3,3-trichloro-2-methyl-1-propene and others.

The aliphatic amino compounds suitable for use in the preparation of the nitrogenous condensation product include those having only amino groups and those having a hydroxyl group in addition to amino groups. The expression "polyamine" will hereinafter be employed to refer to those compounds having only amino groups. The expression "alkanoldiamine" will hereinafter be employed to refer to those compounds having a hydroxyl group as well as amino groups. The expression "amino compound" will be inclusive of both types of compounds. These amino compounds have at least one primary amino group and one secondary amino group in their molecular structure. Examples of the amino compounds which may be employed include diethylenetriamine, 3,3'-diaminodipropylamine, 2-aminoethylaminoethanol, 2-(2-aminoethyl)amino-1-propanol and 2-(2-aminopropyl)-amino-1-propanol.

The aldehydes suitable for the preparation of the condensation product are benzaldehyde and lower aliphatic aldehydes such as formaldehyde, butyraldehyde, isobutyraldehyde, acetaldehyde and propionaldehyde. If desired, mixtures of such aldehydes may be employed.

The preparation of the desired quaternary ammonium compound is carried out by first condensing an aliphatic amino compound and an aldehyde to produce the intermediate nitrogenous condensation product and then reacting the resulting product with an organic halogen compound to produce the desired quaternary ammonium halide.

In preparing the nitrogenous condensation product, an appropriate aldehyde is condensed with an amino compound in a suitable reaction medium such as ethanol and/or water. The reaction occurs with some evolution of heat and the formation of the desired condensation product and water of reaction. The condensation is usually carried out with cooling and stirring to maintain the temperature below 60° C. It is essential in the preparation of the condensation product that no external heating be employed. The preferred temperature range for carrying out this step is from 40° to 55° C. The rate of combining the reactants is dependent upon the initial temperature and the efficiency of cooling.

The amount of aldehyde employed will depend upon the particular amino compound employed. In practice, from about 1.5 to about 2.5 molar proportions of aldehyde is used for each molar proportion of the aliphatic amino compound to obtain a useful nitrogenous condensation product although slight excesses over the above proportions of aldehyde are not detrimental to the reaction. The preferred amount of aldehyde depends in part on the number of nitrogens present in the original amino compound. Thus, when the amino compound is a polyamine, the preferred ratio is about 2.5 moles of aldehyde for one mole of polyamine. When the amino compound is an alkanoldiamine, then the preferred ratio is about 1.5 moles of aldehyde for one mole of alkanoldiamine. The aldehyde may be employed in any suitable form. Thus, the aldehyde, if formaldehyde, may be employed as its commercially available 36–38 percent aqueous solution or as paraformaldehyde. A non-reacting polar solvent is generally employed as reaction medium. Lower alcohols and water are suitable. Ethanol or methanol is preferred over water to provide a suitable solvent for the aliphatic halogen compound reactant of the second step of the reaction and thereby facilitate the second step.

The nitrogenous condensation product thus obtained is a clear, substantially colorless composition which usually forms a gel. Water or polar solvent may be added to the gel to obtain a colorless solution. The gel may also be dehydrated to give a white solid. The removal of the water is preferably carried out under reduced pressure.

The nitrogenous condensation product prepared as above described is treated with an appropriate organic halogen compound in the temperature range of from 18° C. to 110° C. to obtain the desired quaternary ammonium halide. The latter is generally carried out without isolating the condensation product from the condensation reaction mixture. The appropriate organic halogen compound and the reaction medium containing the condensation product are mixed together and agitated whereupon an initial evolution of heat occurs. After the evolution of heat has ceased, the reaction mixture is allowed to stand at room temperature for several days or heated in the temperature range of from 45° to 110° C. with or without pressure for from 3 to 24 hours to obtain the desired quaternary ammonium halide.

The proportion of the organic halogen compound employed per given amount of condensation product depends upon the degree of quaternization desired. By "quaternization" as herein employed is meant the formation of a quaternary ammonium salt in which each quaternary nitrogen in said salt is linked by single carbon-nitrogen bonds to 4 different carbon atoms. As will be set forth in greater detail later, it appears that one molar proportion of the amino compound is considered to produce one equivalent proportion of the nitrogenous condensation product. Thus, usually when one molar proportion of an organic monohalogen compound or 0.5 molar proportion of an organic dihalogen compound is employed per molar proportion of the amino compound originally employed in the preparation of the nitrogenous condensation product, substantially complete quaternization of the saturated tertiary nitrogens present in the condensation product is achieved.

In the preferred method for the preparation of the quaternary ammonium salt, from 1.5 to 2.5 molar proportions of the appropriate aldehyde is added to an alcoholic solution of one molar proportion of amino compound with cooling and stirring so that the temperature does not exceed 60° C. Upon completion of the reaction, a clear, colorless composition of a nitrogenous condensation product is obtained. To the latter composition, from 0.5 to 1.0 molar proportions of an organic halogen compound is added. The resulting mixture is heated in a closed vessel at autogenous pressure to obtain the desired quaternary ammonium halide product. When an organic bromine compound is employed, a temperature of from 45° to 55° C. is adequate. Some organic chlorine compounds may require higher temperatures, even as high as 110° C. After completion of the reaction, the product may be isolated from the resulting composition by removing the solvent under reduced pressure with or without heating and purifying the residue in a conventional manner such as by washing and/or crystallization. The reaction product mixture may be employed directly for many purposes. When alcohol is employed as solvent in carrying out the reaction, the alcohol may be evaporated off and replaced by water to obtain a usable homogeneous composition without isolation of the pure compound. Such compositions are suitable for use as disinfectants, flocculating agents, flotation agents and the like.

In an alternative procedure, the quaternization step may be carried out by heating the condensation product and the organic halogen compound at reflux temperature to obtain the desired quaternary ammonium halide product.

The majority of the condensation products which are employed in the preparation of the quaternary ammonium salts of the invention are believed to have the structure

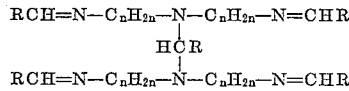

when the reactants are a polyamine and aldehyde, and the structure

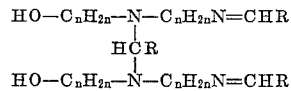

when the reactants are alkanoldiamine and aldehyde. The R in the above structures is an organic residue of an appropriate aldehyde or aldehydes. These condensation products are then quaternized with the appropriate organic halogen compound to produce the desired quaternary ammonium halide.

These quaternary ammonium halides have at least one quaternary ammonium center in which the nitrogen is attached by single bonds to 4 different carbon atoms.

The biological properties of the quaternized condensation products include bactericidal and fungicidal properties. Further, certain of these quaternary ammonium salt compounds are markedly effective and useful as herbicides, particularly for the control of germinant seeds and emerging seedlings. The quaternary ammonium compounds are not equivalent in structure in every use. Those having outstanding properties as herbicides are those in which the condensation product has been quaternized with octyl bromide.

Among previously known quaternary ammonium compounds it has generally been found that any bactericidal activity of such compounds is reduced or completely destroyed by organic matter, plasma, protein and other reactive substances. It is unusual to find a quaternary ammonium compound having bactericidal activity in the presence of protein. Such unexpected activity has been found for the compounds of the present invention. Particularly effective in this respect are the quaternary ammonium bromides having at least one quaternary nitrogen substituted by an octyl group.

Nitrogenous condensation products quaternized with alkyl halides are also useful for the control of *Pityrosporum ovale*, a yeast organism. Particularly active against this organism is the product quaternized with octyl bromide. Furthermore, certain of the quaternary ammonium salts have a definite desirable nematocidal activity. Particularly useful as nematocides are those condensation products which have been quaternized with lauryl and cetyl halides. Thus, the condensation products quaternized with alkyl halides containing from 8 to 16 carbon atoms constitute a preferred embodiment of the invention.

These quaternized nitrogenous condensation products are also useful as flocculating and precipitating agents. In such use, the products are adapted to be employed for water clarification, flocculation of pulp suspensions, and precipitation of lignin sulfonic acids from spent sulfite liquors. Furthermore, their surface-active properties provide for adaptation in secondary oil recovery and ore flotation processes.

The following examples illustrate the invention but are not to be construed as limiting.

*Example 1*

85 grams of paraformaldehyde of 91 percent purity (corresponding to 2.6 moles of formaldehyde) was added to a solution of 103 grams (1.0 mole) of diethylenetriamine in 400 grams of ethanol. Cooling and stirring were employed to keep the temperature between 45° and 55° C. during the addition. After completion of the addition, stirring was continued at room temperature for one hour. Unreacted paraformaldehyde and solid impurities present in the reaction mixture were filtered off. The filtrate, comprising a solution of the nitrogenous condensation product had a 40 percent solids content.

97 grams (0.5 mole) of octyl bromide was added to the above solution. Some evolution of heat occurred. The resulting mixture was allowed to stand at room temperature for about an hour. The weight of this reaction mixture was 613 grams. The mixture was then heated at 50° C. for three hours in a closed vessel to obtain an alcoholic composition containing the N-monooctyl quaternary ammonium bromide of the diethylenetriamine-formaldehyde condensation product.

The ionic bromide content of this product mixture was determined by Volhard analysis and was found to be 6.26 percent. The theoretical ionic bromide content of the above mixture containing the quaternized condensation product and weighing 613 grams is 6.5 percent. This corresponds to a 96.5 percent yield of the product. The empirical formula for the quaternized condensation product is $C_{21}H_{43}N_5Br$ and the molecular weight 459.6.

*Example 2*

300 grams of paraformaldehyde (equal to 10 moles of formaldehyde) was added with stirring to a solution of 412.6 grams (4 moles) of diethylenetriamine in 620 grams of ethanol. Cooling and stirring were employed to maintain the temperature between 50° to 55° C. After completion of the addition, the mixture was allowed to cool to room temperature whereupon a condensation product was obtained as a gel of 40 percent solids content.

Portions of the above composition were employed to prepare the desired quaternary ammonium compounds. The amounts of organic halogen compound employed to prepare the quaternary halide were based proportionately on the amount of condensation product present in the reaction mixture. One saturated tertiary amino center capable of forming one quaternary ammonium group was considered to be produced from the reaction of each mole of diethylenetriamine with 2.5 moles of formaldehyde.

10.9 grams (0.1 mole) of ethyl bromide was added to 66.5 grams of the reaction mixture containing 40 percent solids (corresponding to 0.2 molar proportion of diethylenetriamine reactant in the condensation product) above prepared with intermittent shaking until heat was no longer evolved. The resulting mixture was capped and heated at 50° C. for 15 hours to obtain an N-monoethyl quaternary ammonium bromide of the diethylenetriamine-formaldehyde condensation product as a red-colored solution. The ionic bromide content as determined by a Volhard analysis was 48.0 percent. The theoretical bromide content for the mixture is 48.5 percent. This corresponds to a yield of 99 percent.

In a similar manner, 21.8 grams (0.2 mole) of ethyl bromide is reacted with 66.5 grams of the condensation product to obtain an N,N'-diethyl bis(quaternary ammonium bromide) of the diethylenetriamine-formaldehyde condensation product. The ionic bromide content as determined by Volhard analysis was 53.2 percent. The theoretical bromide content is 54.8 percent. This corresponds to a yield of 97 percent.

*Example 3*

In preparations similar to those of Example 2, the condensation product obtained in Example 2 was caused to react with the alkyl bromides listed below to obtain alcoholic compositions containing the corresponding mono- and di-N-alkyl quaternary ammonium salts.

| Alkyl Bromides | Moles of Bromide Employed per Mole of Diethylenetriamine Employed to Produce Condensation Product | Percent Yield Based on Volhard Analysis for Ionic Bromide |
|---|---|---|
| Butyl bromide | 1 | 97 |
| Do | 2 | 97 |
| Octyl bromide | 1 | 94 |
| Do | 2 | 96 |
| Lauryl bromide | 1 | 102 |
| Do | 2 | 89 |
| Cetyl bromide | 1 | 99 |
| Do | 2 | 88 |

*Example 4*

21.6 grams (0.1 mole) of tetramethylenedibromide was added to 66.5 grams of the diethylenetriamine-formaldehyde condensation product prepared in Example 2. The addition was accompanied by evolution of heat. The resulting mixture was permitted to cool to room temperature, capped and heated at 50° C. for 15 hours to obtain a clear solution of tetramethylene bis(quaternary ammonium bromide) of the diethylenetriamine-formaldehyde condensation product. The ionic bromide content by Volhard analysis was 54.0 percent. The theoretical bromide content of a mixture containing the quaternized condensation product is 54.6 percent. This corresponds to a 99 percent yield.

*Example 5*

In similar preparations, 0.1 molar proportions of the alkylene dibromides listed below were caused to react with an amount of condensation product obtained in Example 2 corresponding to 0.2 molar proportions of diethylenetriamine reactant in the condensation product to obtain alcoholic compositions containing the N,N'-alkylene bis(quaternary ammonium bromide) of the diethylenetriamine-formaldehyde condensation product.

| Alkylene Dibromide | Percent Yield based on Volhard Analysis for Ionic Bromide |
|---|---|
| Trimethylene dibromide | 101.5 |
| Ethylene dibromide | 94.5 |

*Example 6*

16.0 grams (0.1 mole) of 3,3,3-trichloro-2-methyl-1-propene was added to 66.5 grams of diethylenetriamine-formaldehyde condensation product mixture prepared in Example 2 (corresponding to 0.2 molar proportion of diethylenetriamine reactant in the condensation product). The addition was carried out at room temperature with shaking and stirring. There was no visible sign of reaction. The reaction mixture was then heated at 50° C. in a closed reaction vessel for 15 hours to obtain a clear red-colored solution of N-mono-3,3-dichloro-2-methylallyl quaternary ammonium chloride of the diethylenetriamine-formaldehyde condensation product. The ionic chloride content as determined by Volhard analysis was 48.8 percent. The theoretical chloride content is 51.6 percent. This corresponds to a yield of 94.5 percent.

*Example 7*

300 grams of paraformaldehyde (equal to 10 moles of formaldehyde) was slowly added to a solution of 524 grams (4 moles) of 3,3'-diaminodipropylamine in 816 grams of ethanol. Cooling and stirring were employed to maintain the temperature between 50° to 55° C. during the addition. The resulting solution containing the condensation product formed a gel containing 40 percent solids on cooling to room temperature.

13.7 grams (0.1 mole) of butyl bromide and 80.5 grams of the condensation product above prepared (corresponding to 0.2 molar proportion of 3,3'-diaminodipropylamine reactant in the condensation product) were mixed. There was no visible sign of reaction. The mixture was heated in a closed reaction vessel at 50° C. for 15 hours. At the end of this period, an N-monobutyl quaternary ammonium bromide of 3,3'-diaminodipropylamine-formaldehyde condensation product was obtained as a pale-yellow solution. The ionic bromide content of this mixture by Volhard analysis was 48.0 percent. The theoretical bromide content of a mixture containing the quaternized condensation product is 48.6 percent. The yield of product by Volhard analysis corresponds to 99 percent.

*Example 8*

In similar preparations, the condensation product obtained in Example 6 was added to the alkyl bromides listed below to obtain alcoholic compositions containing the corresponding mono- and di-N-alkyl quaternary ammonium bromides of the 3,3'-diaminodipropylamine-formaldehyde condensation product.

| Alkyl Bromide | Moles of Bromide Employed Per Mole of 3,3'-Diaminodipropylamine Employed to Produce Condensation Product | Percent Yield Based on Volhard Analysis for Ionic Bromide |
|---|---|---|
| Ethyl bromide | 1 | 102.0 |
| Do | 2 | 94.0 |
| Butyl bromide | 2 | 94.0 |
| Octyl bromide | 1 | 93.0 |
| Do | 2 | 92.5 |
| Cetyl bromide | 1 | 99.5 |
| Do | 2 | 91.0 |

Example 9

103 grams (1.0 mole) of diethylenetriamine was dissolved in 707 grams of ethyl alcohol, and 265 grams (2.5 moles) of benzaldehyde was slowly added thereto with stirring to maintain the temperature in the range of from 45° to 55° C. After completion of the addition, the reaction mixture was stirred for an additional hour. The alcohol lost by volatilization was replaced. The resulting alcoholic solution of diethylenetriamine-benzaldehyde condensation product contained 30 percent solids.

48 grams (0.25 mole) of normal-octyl bromide was added to 537 grams of the above reaction mixture (corresponding to 0.5 molar proportion of diethylenetriamine reactant in the condensation product). The resulting mixture was heated under reflux for 8 hours to obtain an N-mono-octyl quaternary ammonium bromide of the diethylenetriamine - benzaldehyde condensation product. The ionic bromide content of this product mixture was determined by Volhard analysis and was found to be 34.4 percent. The theoretical ionic bromide content is 35.9 percent. This analysis of product mixture corresponds to a 95.8 percent yield of quaternary bromide product.

Example 10

104 grams (1.0 mole) of 2-aminoethylaminoethanol was dissolved in 525 grams of ethyl alcohol and 159 grams (1.5 moles) of benzaldehyde was slowly added thereto with stirring to maintain the temperature in the range of from 45° to 55° C. After completion of the addition, the reaction mixture was stirred for an additional hour. The alcohol composition of 2-aminoethylaminoethanol - benzaldehyde condensation product amounted to 788 grams and contained 30 percent solids.

48 grams (0.25 mole) of normal-octyl bromide was added to 394 grams of the above reaction mixture (corresponding to 0.5 molar proportion of 2-aminoethylaminoethanol reactant in the 2-aminoethylaminoethanol-benzaldehyde condensation product). The resulting mixture was heated under reflux for 8 hours to obtain an N-mono-octyl quaternary ammonium bromide of benzaldehyde condensation product. The ionic bromide content of this product composition was 35.55 percent. The theoretical ionic bromide content is 37.6 percent. The analysis shows a 94.5 percent yield of reaction product.

Example 11

41.2 grams (0.4 mole) of diethylenetriamine was dissolved in 125 grams of ethyl alcohol and 72 grams (1 mole) of butyraldehyde was slowly added thereto with stirring to maintain the temperature in the range of 45° to 55° C. After completion of the addition, the reaction mixture was stirred for an additional hour. The alcoholic composition of the diethylenetriamine-butyraldehyde condensation product amounting to 238.2 grams had a 40 percent solids content.

38.6 grams (0.2 mole) of normal-octyl bromide was added to 11.9 grams of the above reaction mixture (corresponding to 0.2 proportion of diethylenetriamine reactant in the condensation product). The resulting mixture was heated in a closed reaction vessel at about 50° C. for 15 hours to obtain an N,N'-dioctyl quaternary ammonium bromide of diethylenetriamine-butyraldehyde condensation product. The ionic bromide content of this product composition was 53.6 percent. The theoretical bromide content is 54.6 percent. The yield of the product by Volhard analysis corresponds to 98 percent.

Example 12

In a similar manner, 47.2 grams (0.4 mole) of 2-(2-aminoethylamino)-1-propanol in 70.8 grams of ethyl alcohol was condensed with 18 grams of paraformaldehyde (equal to 0.6 mole of formaldehyde). 68 grams of the resulting product composition (corresponding to 0.2 molar proportion of 2-(2-aminoethylamino)-1-propanol in the condensation product) was quaternized with 38.6 grams (0.2 molar proportion) of normal-octyl bromide to produce an N,N'-dioctyl bis-quaternary ammonium bromide of 2-(2-aminoethylamino)-1-propanol-formaldehyde condensation product. The ionic bromide content by Volhard analysis was 53.7 percent. The theoretical value is 61.7 percent. The analysis indicates a yield of 87 percent of the quaternary salt.

Example 13

41.2 grams (0.4 mole) of diethylenetriamine was dissolved in 118 grams of ethyl alcohol and 24 grams of paraformaldehyde (equal to 0.8 mole of formaldehyde) was added thereto with stirring and cooling to maintain the temperature in the range of 45° to 50° C. Stirring was continued until all the paraformaldehyde dissolved. Thereafter, 14.4 grams (0.2 mole) of butyraldehyde was added and the resulting mixture allowed to stand for 1 hour at room temperature to obtain a diethylenetriamine-formaldehyde-butyraldehyde condensation product, in a 40 percent solids alcoholic composition.

99 grams of the above composition (corresponding to 0.2 molar proportion of diethylenetriamine in the condensation product) and 19.3 grams (0.1 mole) of normal-octyl bromide were heated together under autogenous pressure at about 50° C. for 15 hours to obtain an N-mono-octyl quaternary ammonium bromide of the diethylenetriamine-formaldehyde-butyraldehyde condensation product. The theoretical ionic bromide content is 49.8 percent. The ionic bromide by Volhard analysis was 45.8 percent or 92 percent of theoretical.

Example 14

1260 grams (15 moles) of 36 percent formaldehyde was added to a solution of 618 grams (6.0 moles) of diethylenetriamine in 1000 grams of ethyl alcohol and 1000 grams of water, to produce a diethylenetriamine-formaldehyde condensation product. The addition of the formaldehyde was carried out slowly to maintain a temperature in the reaction mixture below 50° C. After completion of the addition, 300 grams (3.0 moles) of ethylene dichloride was added thereto and the mixture heated in the temperature range of from 100° to 110° C. under autogenous pressure for 8 hours to produce the ethylene bis(quaternary ammonium chloride) of the diethylenetriamine-formaldehyde condensation product. The ionic chloride content of the reaction mixture was found by Volhard analysis to be 4.24 percent. The theoretical value is 5.1 percent. The yield of the product by ionic chloride determination is 83.2 percent of theoretical.

Example 15

103 grams (1.0 mole) of diethylenetriamine was dissolved in 400 grams of ethyl alcohol and 85 grams of paraformaldehyde (equal to 2.5 moles of formaldehyde) of 91 percent purity added thereto. The addition was carried out slowly and with stirring to maintain the reaction temperature between 45° and 55° C. After completion of the addition, the mixture was stirred for an additional hour and then filtered to remove any unreacted paraformaldehyde and/or impurities to obtain an ethanolic solution of diethylenetriamine-formaldehyde condensation product.

63.0 grams (0.5 mole) of benzyl chloride was added to the filtrate and the resulting mixture allowed to stand at room temperature for 4 days to produce an N-monobenzyl quaternary ammonium chloride of the diethylenetriamine-formaldehyde condensation product in a yield of 89.5 percent as determined by Volhard analysis. The mixture was then heated at 50° C. for 4 hours under autogenous pressure and the yield thereby was increased to 96 percent.

Example 16

In similar preparations, compositions comprising quaternary ammonium salts were prepared from the condensation products and organic halogen compounds as listed below:

| Condensation Product | Ratio, Amine/Aldehyde | Organic Halogen Compound |
|---|---|---|
| Diethylenetriamine-formaldehyde | 1/2.5 | secondary-butylbromide. |
| Do | 1/2.5 | isobutyl chloride. |
| Diethylenetriamine-butyraldehyde-formaldehyde | 1/2.0/0.5 | octyl bromide. |
| Diethylenetriamine-formaldehyde | 1/2.5 | vinyl benzyl chloride.[1] |
| Do | 1/2.5 | octyl chloride. |

[1] Predominantly para isomer.

The products of the present invention are useful for the control of *Pityrosporum ovale*. In a representative operation, nutrient agar medium containing 0.5 percent by weight of quaternary ammonium compound was streaked with the test organism and incubated at 37° C. for 5 days. At the end of this period, the surfaces were examined for microbial growth and compared with similarly inoculated check media containing no quaternary ammonium compound. The results obtained were as follows:

| Condensation Product | Halogen Compound | Ratio, Amine/Aldehyde/Halogen Compound | Growth |
|---|---|---|---|
| 3,3'-Diaminodipropylamine-formaldehyde | Butyl bromide | 1/2.5/2 | None. |
| Do | Octyl bromide | 1/2.5/1 | Do. |
| Do | ----do---- | 1/2.5/2 | Do. |
| Do | Lauryl bromide | 1/2.5/1 | Trace. |
| Do | 3,3,3-trichloro-2-methyl-1-propene | 1/2.5/2 | None. |
| Diethylenetriamine-formaldehyde | 3,3,3-trichloro-2-methyl-1-propene | 1/2.5/2 | Do. |
| Diethylenetriamine-butyraldehyde | Octyl bromide | 1/2.5/1 | Do. |
| Do | ----do---- | 1/2.5/2 | Do. |
| 2-Aminoethyl-aminoethanol-formaldehyde | ----do---- | 1/1.5/1 | Trace. |

A check medium containing no quaternary ammonium compound showed prolific growth of the yeast organism.

The quaternary compounds of the present invention, particularly the octyl bromide derivatives, are useful as bactericides. This activity is retained in the presence of proteinaceous material. Thus, in a representative operation, nutrient broth media were prepared, one medium containing added 5.0 percent by weight of horse serum. To each medium was added 0.005 percent by weight of mono-octyl quaternary bromide of the diethylenetriamine-butyraldehyde condensation product and the media inoculated with *Staphylococcus aureus* and incubated at 37° C. for 24 hours. At the end of this period, subcultures were made from the inoculated broth by swabbing nutrient agar slants and incubating for 24 hours as 37° C. On examination of the slants at the end of this period, no bacterial growth was observed.

The products of the present invention may also be used in flocculation and precipitation. For example, they may be used for clarifying water containing finely divided suspended solids. In a representative operation, 0.1 milliliter of a 10 percent aqueous solution of N,N'-dilauryl bis (quaternary ammonium bromide) of the diethylenetriamine-formaldehyde condensation product was intimately dispersed in 50 milliliters of an aqueous slurry of clay and silt and the time required for the flocculated material to settle was determined. It was found that the suspended solids in the treated slurry settled in 0.75 minute whereas 50 milliliters of the same aqueous slurry containing no quaternary ammonium product required 8 minutes for settling.

This application is a continuation-in-part of my prior application, Serial No. 665,639, filed June 14, 1957, now abandoned.

I claim:

A quaternary ammonium halide obtained by the reaction carried out in the temperature range of from 18° C. to 110° C. of (*a*) one-half to one molar proportion of an alkyl halide containing from 8 to 16 carbon atoms, inclusive, wherein said alkyl halide is selected from the group consisting of alkyl chloride and alkyl bromide with (*b*) a condensation product obtained by reacting in a polar solvent selected from the group consisting of alcohol and water at a temperature in the range of from 40° to 55° C. one molar proportion of an aliphatic amino compound having the formula $$X-(-C_nH_{2n}NH-)_2-H$$

wherein X is a member of the group consisting of amino and hydroxyl and *n* is an integer of from 2 to 3, inclusive, with 1.5 to 2.5 molar proportions of an aldehyde selected from the group consisting of lower aliphatic aldehydes and benzaldehyde.

No references cited.